2 Sheets--Sheet 1.

J. B. SLAWSON.

Improvement in Fare-Boxes.

No. 5,788.

Reissued March 10, 1874.

*Witnesses.*

A. McCallum

*Inventor.*

J. B. Slawson by his Atty

P. Hannay

AM. PHOTO-LITHOGRAPHIC Co. N.Y. (OSBORNE'S PROCESS.)

J. B. SLAWSON.

Improvement in Fare-Boxes.

No. 5,788. Reissued March 10, 1874.

*Witnesses.*
A. McCallum
D. G. Stuart

*Inventor:*
J. B. Slawson
by his Atty
P. Hannay

AM. PHOTO-LITHOGRAPHIC Co. N.Y. (OSBORNE'S PROCESS.)

UNITED STATES PATENT OFFICE.

JOHN B. SLAWSON, OF NEW YORK, N. Y.

IMPROVEMENT IN FARE-BOXES.

Specification forming part of Letters Patent No. 132,698, dated October 29, 1872; reissue No. 5,788, dated March 10, 1874; application filed August 1, 1873.

*To all whom it may concern:*

Be it known that I, JOHN B. SLAWSON, of New York, in the county and State of New York, have invented certain Improvements in Fare-Boxes, of which the following is a specification, reference being had to the accompanying drawings, in which—

Figure 1:
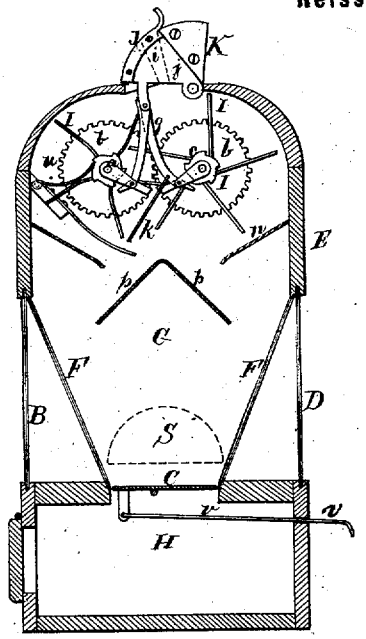
Figure 2:
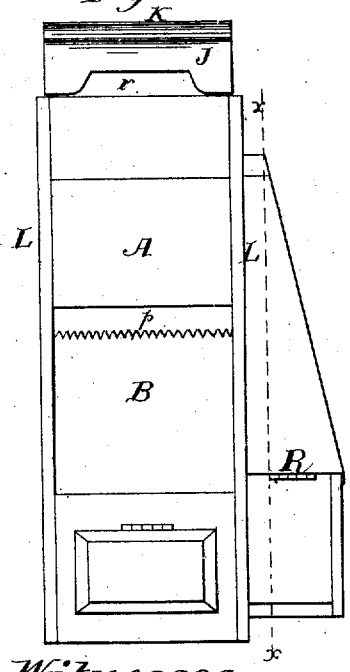
Figure 3:
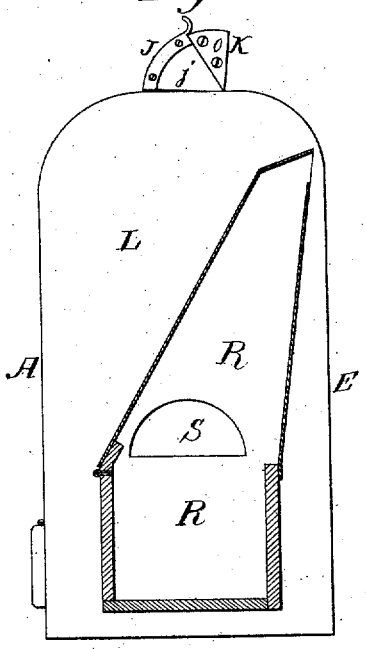
Figure 4:
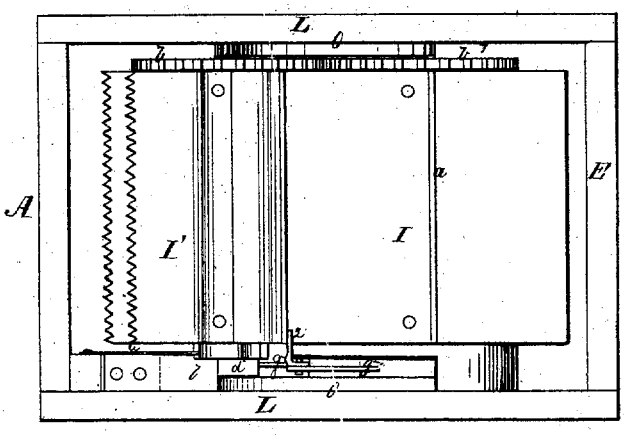
Figure 5:
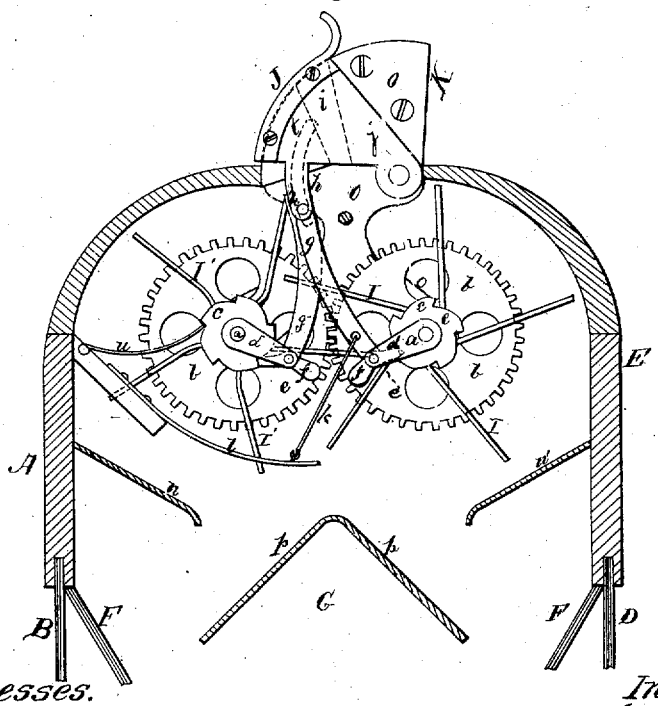

Figure 1 represents a vertical section through the middle of a box, from front to rear, having my improvements applied thereto; and Fig 2, a front elevation of the same. Fig. 3 represents a vertical section through the line *x x* of Fig. 2; and Fig. 4, a plan of the improved box with the top and mouth-block, and also the lamp-chamber removed. Fig. 5 is an enlarged view—a portion of Fig. 1.

My invention relates to that class of fare-boxes in which a self-closing gate or door is so arranged as to cover or protect the mouth through which the fare is deposited in the box; and has for its object such a construction of the box as will provide, in a surer manner, against fraudulent abstraction of the fare when once deposited in the box, and temporarily arrested for examination in the inspection-chamber.

My invention consists in combining with a self-closing gate or door, so arranged as to cover or protect the mouth of a fare-box, and which is intended to be operated or opened by the passengers, in order to enable them to deposit their fare in the box, a double or combined arrest device operating upon a new and improved plan, so that they may be able to carry the following conditions into effect, to wit: First, that the arrest devices shall fairly and fully cover or protect the channel that leads from the mouth of the box to the inspection-chamber below, by interlapping with each other as well during the opening as the closing of the door; secondly, that the one shall act as the receiving or arrest device proper of the fare, when first deposited by the passengers into the box, and the other as an auxiliary covering or protecting device to the channel before referred to, in order to protect the fare previously deposited in the inspection-chamber against fraudulent abstraction; thirdly, that the two shall be so connected with each other by gears, or otherwise, that any movement imparted to the one must of necessity be imparted to the other, and that in reverse directions, so that they shall not interfere with each other, but on the contrary preserve their proper and relative positions to each other in order to accomplish the desired result.

It is also very desirable, but not absolutely essential, to have these two devices so connected to the self-closing door, that, on the closing of the latter, the fare just deposited upon the one should simultaneously therewith be dropped into the inspection-chamber, sufficient motion for this purpose being by that act imparted to them. By this plan, therefore, each passenger is not only enabled to deposit his fare into the box, but is indirectly made the means of depositing it for inspection in a safety-chamber below—a point of great importance in this class of fare-boxes.

My invention further consists in combining an inspection-chamber with the self-closing door and the arrest devices just referred to, (and all of which are operated by the act of the passenger in opening the door,) when said chamber is arranged below, and provided with one or two transparent mediums, through which the passenger or driver, or both, may inspect the fare; and with an arrest to receive and stop the latter for examination as it is dropped by the arrest devices above.

It also consists in combining with an arrest composed of two separate and distinct parts moving relatively, so as to lap on each other in the manner above referred to, and which is operated automatically through the action of a self-closing door solely under the control of the passengers, another arrest arranged below and solely under the control of the driver or conductor, for purposes to be hereinafter set forth.

My invention further consists in combining with the self-closing door, and the two pieces or parts which constitute the upper arrest and channel-protector, certain devices, by means of which any motion imparted to the one is necessarily, positively, and automatically communicated to the other, that they may always preserve their proper relation to each other.

It further consists in combining with a fare-box provided with an arrest device, composed of two distinct parts, &c., the operation of which is such as to drop the fare centrally, as it were, down the channel that leads to the arrest below, a roof or ridge-shaped guard, for a purpose to be hereafter described; and, lastly, in combining with a box having an upper arrest consisting of two distinct parts or pieces, side guard-plates suitably arranged, for a purpose to be hereafter specified.

To enable others skilled in the art to make, construct, and use my invention, I will now proceed to describe its parts in detail, omitting a particular description of such parts of a fare-box as are common to other boxes, and well known.

The box may be made in any suitable form, and of any suitable material or combinations of material. A box of suitable shape is represented in the drawing, consisting of four inclosed sides, a bottom, and curved top. In the front side A is arranged a glass light, B, or other transparent medium, through which the passengers can examine the fare when arrested on the apron C, another one, D, being similarly framed into the rear side E, for the convenience of the driver or conductor in making his examination of the fare. Two other, but inclined, glass plates, F, are arranged on the inside, which act as guides for the fare to the arrest-apron C. As thus constructed, the box is divided into two communicating chambers, G and H, by the tilting-apron C. Near the top of the upper or inspecting chamber G are mounted two fan-bladed wheels, I and I′, on shafts *a*, having their bearings in the sides of the box, and the legs of the standards O that support the mouth-block K. These wheels are so arranged that the blades of the one are made to interlap with the blades of the other, as shown in Fig. 1, the blades being bent or curved to facilitate this operation—that is to say, that they may the more readily pass each other. Each shaft *a*, at one end of the blades, is provided with a pinion, *b*, which mesh with each other, and are of the same size and carry the same number of teeth. On the opposite end of each shaft, on the other side of the blades, is secured a ratchet-wheel, *c*; and on the outside of that again is loosely mounted a crank-lever, *d*, to the inner side of which (the side next the ratchet-wheels on the same shaft *a*) is secured a stud or pivotal pin, *e*, (see Fig. 5,) on which is hung a weighted pawl, F, so arranged as to mesh with the teeth of the ratchet-wheel *c*. To the lever *d* is connected, by means of a hinge-joint, a rod or lever, *g*, the other end of which is connected by a similar joint to an arm, *h*, formed on or otherwise secured to the frame *j* of the hinged gate or door J that covers the mouth *i* of the box. The lever *g*, near its lower end, is connected, by means of a rod, *k*, to a spring-bar, *l*, made fast to a bar or supporting-beam, *m*, screwed to the side of the box. Thus constructed, as the gate J is turned on its hinges—that is to say, raised by the passengers to unclose the mouth, to deposit their fare—its arm *h* drags with it the lever *g*, which, in turn, acting on the lever *d*, raises the pawl *f*, causing it to engage with the upper tooth of the ratchet-wheel *c*, it, in this respect, being arrested by the under side of the guide-plate N. The fare having been deposited and the hand removed, the spring *l*, acting on the lever *g* through the rod *k*, causes the latter to descend, carrying with it the gate J and pawl *f*, thereby turning the ratchet-wheel *c* and, with the latter, the fan-bladed wheels I and I′. The movement of the ratchet-wheels is so graduated as to cause the blades of the wheels I and I′ to perform so much of a revolution as will enable a fare to be dropped by the blade of the arrest-wheel I proper upon the arrest-apron C, each time the gate is opened and shut, and so as to bring the following blade into proper position to receive the next fare. By reference to Figs. 1 and 5, it will be seen that the blade which receives the fare when in proper position has a declination toward its axis, and hence, with the following or vertical blade, forms a cup or receptacle for the fare, so that any elastic device which may be used for fraudulent purposes must be confined in its operations to this chamber, and could not pass to the chamber G below. To prevent the wheels from turning too far, a stop, 2, is attached to one of the levers *g*, which, as the latter descends, arrests the blade of the wheel I′, as seen in Figs. 4 and 5. Usually the wheels will be provided with three or four blades, and will in such case perform a third part of a revolution for three and a fourth part for four blades, and in like proportion for any other number of blades, but these are deemed the preferable numbers. In the drawing, the box is represented as having a ratchet-wheel, *c*, lever *d*, pawl *f*, and connecting-rod *g* for each wheel; but one set may be sufficient for both, inasmuch as their pinions *b* mesh with each other, and are of the same size and carry the same number of teeth, and hence have the same extent of motion. At the same time it may be well to use both, as they will be apt to operate with more certainty and precision. The mouth *i* of the box is formed in a block, K. This block is curved in front and secured at each end to two metallic standard-plates, O, which in turn are made fast to the inner face of the sides L of the box. The gate J is made of metal, and so curved as to conform to the external shape of the curved front of the block K, and is attached at each end to an arm, *j*, pivoted to the standards O at a point which forms the center of the circle of which the curve of the block K is the circumference. To one of the arms *j* is secured the arm *h*, by which the gate, as before stated, is connected to the lever *g* and other operative devices of the wheels I and I′, for which purpose (the arm *j* being on the outside and lever *g* on the inside of the standard O) a curved slot, *t*, is cut in one of the standards O, and into which plays the pivotal pin that connects the arm *j* and lever *g* together. In a line below the wheel I′, to the front side A of the box, is secured, in any suitable manner, an inclined metallic plate, *n*, which extends the whole width of the box, and is provided on its lower edge with a series of saw-teeth throughout its length, similar to those shown at *p*, Fig. 2, a similar plate, *n'*, being secured in like manner to the rear side E. Below these, and below the wheels I I', and centrally between them, (see Fig. 1,) is arranged a double or roof-shaped plate, *p*, similarly provided with saw-teeth on its lower edges, (see Fig. 2,) which extends all the way across the box, and is secured to the sides L. As thus constructed and arranged these plates *n n'* and *p*, in the event of any device being so operated as to pass the blades of the wheels, and thence down to the arrest-apron C, for fraudulent purposes, will arrest and strip the fare from such device, as it is attempted to be withdrawn from the box. To the side of the box is attached a lamp-chamber, R, an opening, S, covered by a glass light, being made in the side of the box to admit the light of the lamp to the chamber G, in order to illuminate the fare at night for inspection purposes.

The operation is simple. The passenger, by means of the lip *r*, raises the gate J until the mouth *i* is uncovered. He then deposits his fare and releases the gate, which is immediately closed by the reaction of the spring *l* on the connecting-link *k*, lever *g*, and arm *h*, of the gate, which drags them down, and with them the gate; and in doing so, through the pawl *f* and ratchet-wheel *c*, causes the wheels I and I', as before stated, simultaneously to perform a partial revolution, sufficient to precipitate the fare (just deposited and arrested on the blade of the wheel I) down upon the arrest-apron C, for inspection, it in its descent passing over one side of the ridge-shaped plate *p*. At this stage it becomes the duty of the driver to inspect it, and which he does through the window D, and glass guide F. When satisfied that the fare is correct, he then deposits it into the receiving-chamber H, by pulling the rod *v*, which will cause the apron C to tilt and drop the fare. By connecting the arrest devices I and I' together, through the interposition of gears *b*, any motion imparted to the one must be imparted to the other, and the gears being of equal size and number of teeth, their extent of motion must necessarily be the same, and in reverse directions; hence a constant and proper relation is preserved between the two. It also follows that the one—say I—must necessarily always act as the arrest proper, and the other, I', as the covering or protecting device, where, each time the gate is operated, the motion imparted to them is sufficient to turn them far enough to drop the fare just deposited into the chamber G from the apron or cup which received or arrested it, and to bring the next arm into the proper position to catch the next fare. The chamber H, although not so represented in the drawing, is intended to be provided with a locked drawer, as in my other patented boxes.

To prevent backward movement in the wheels I and I', a small spring-detent, *u*, secured to the side of the box, is arranged to engage with the teeth of the ratchet-wheel *c*.

Having described my improvement in fare-boxes, what I claim is—

1. The combination of a self-closing door, J, with an arrest device composed of two separate and distinct parts, I and I', operating in the manner substantially as shown and described, for the purposes set forth.

2. The combination of a self-closing door, J, to be operated by the passengers, and a compound arrest I and I', operating substantially as set forth, with a fare-box provided with an inspection-chamber G, for the purpose set forth.

3. A fare-box provided with the following instrumentalities, to wit: A self-closing door, J, solely under the control of the passengers; a double-arrest device I and I', operating substantially as described; an inspection-chamber, G, having an opening or openings, B D, covered by a transparent medium; and an arrest, C, solely under the control of the driver or conductor, the whole operating substantially as described, for the purposes set forth.

4. A compound arrest consisting of two distinct parts, I and I', the same being positively connected with each other in such manner that any motion imparted to the one must be imparted to the other, for the purpose set forth.

5. The combination of the ridge-shaped guard-plate *p* with an arrest consisting of two separate and distinct parts, I and I', as arranged, and for the purpose set forth.

6. The combination, in a fare-box, of a combined arrest, I and I', operating in the manner substantially as described, with two side guard-plates, *n* and *n'*, for the purpose set forth.

7. The combination, in a fare-box, of two side guards, *n* and *n'*, with a central and fixed ridge-shaped guard-plate, *p*, substantially as shown and described, each being rigidly secured in place, for the purpose set forth.

8. The stop 2, combined with the lever *g*, and with a rotating arrest device, for the purpose set forth.

In testimony whereof I have hereunto subscribed this specification.

J. B. SLAWSON.

Witnesses:
D. G. STUART,
A. McCALLUM.